Patented June 17, 1941

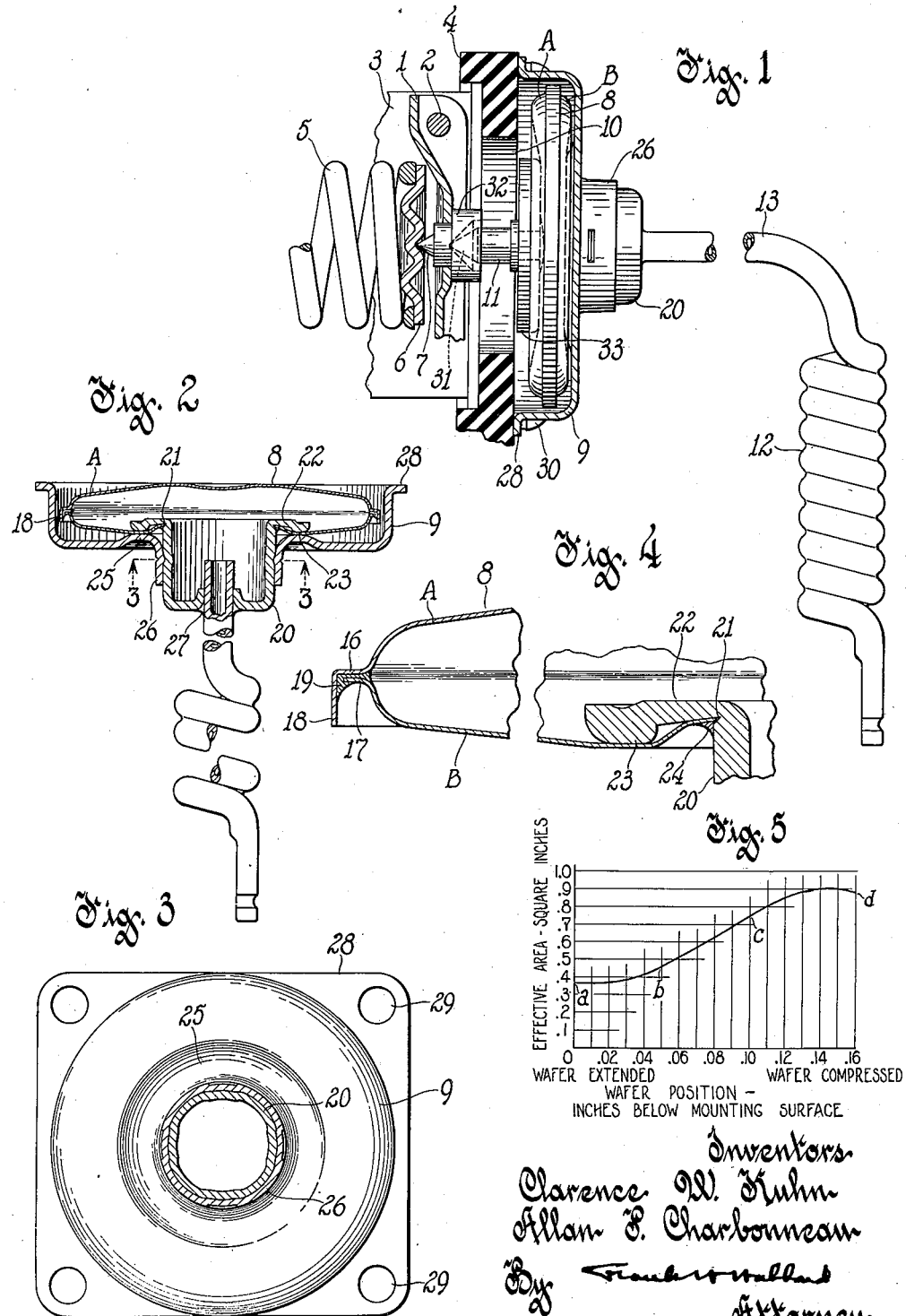

2,245,691

UNITED STATES PATENT OFFICE 2,245,691

OPERATING MECHANISM FOR REFRIGERATOR CONTROLLERS AND OTHER DEVICES

Clarence W. Kuhn, Wauwatosa, and Allan P. Charbonneau, Milwaukee, Wis., assignors to Cutler-Hammer, Inc., Milwaukee, Wis., a corporation of Delaware Application August 7, 1937, Serial No. 157,988

8 Claims. (Cl. 297—9)

This invention relates to improvements in operating mechanisms for controllers for electric refrigerators particularly of the domestic type, and other mechanisms.

Controllers for refrigerators of the domestic type usually must have cold control, or in other words must be adjustable over a wide range. Such adjustment is commonly obtained by adjusting the loading spring against the pressure of which the controller is operated by a thermal element of the pressure responsive type. Thus for uniformity of adjustment of controllers produced in quantity it is necessary to provide for uniformity of action of the spring and also uniformity of action of the pressure responsive element, the latter being obtainable only by maintaining the effective area of said element constant throughout a considerable range of movement. To afford the degree of movement required of the controller element to be actuated and to obtain such uniformity of action of the pressure responsive element it commonly has been the practice to form such element as bellows having a plurality of expansible sections. It has become a requirement to confine the refrigerator control unit including the bellows in a very limited space, and hence the permissible diameter of the bellows has been limited. The bellows now universally used for such refrigerator controllers are formed of a single piece of very thin sheet metal and satisfactory bellows of this type have a high cost relative to the cost of the controllers in which they are used, whereas the controllers inclusive of the bellows must be produced at a very low cost to be commercial. Moreover bellows of the type mentioned are unreliable due to the extremely severe working of the metal thereof in the course of production, and due also to difficulty in plating them for protection against corrosion. Both the severe working of the metal of such bellows and the corrosion thereof frequently result in breakdown of the bellows and bellows trouble constitutes the major trouble experienced with refrigerator controllers.

Also refrigerator controllers require rugged switch mechanisms of the snap type which while designed for operation in response to a relatively small force and upon relatively slight expansion of the bellows nevertheless necessitate provision of a substantial operating force and a substantial movement of the controller element dependent on the bellows for its movement, and heretofore because of non-availability of any other means suitable in such respects and also sensitivity, bellows have been resorted to despite the aforementioned and other disadvantages thereof.

The present invention has among its objects to provide an operating mechanism suitable for such refrigerator controllers and other mechanisms which in lieu of bellows has a pressure responsive expansible element of a construction more reliable than bellows and at the same time less expensive.

Another object is to provide a wafer type operating means for refrigerator controllers which will enable cold control adjustment with uniformity, the wafer being of a diameter not substantially greater than the diameter of the bellows now employed and yet affording the sensitivity, substantial force and substantial range of movement required in practice.

Another object is to employ the pressure responsive wafer in such way as to obtain a maximum of motion upon a given change in pressure.

Another object is to provide such operating means including a wafer which may be of the gas containing type and which is so related to its cooperating parts that its movement in response to increase and decrease in pressure to critical values is without snap action and is smooth and uniform.

Another object is to provide for ready attachment to a refrigerator controller or other device, a self-contained unit comprising such a wafer, a bulb, a connecting tube and a casing for the wafer to serve as a mounting medium.

Another object is to provide such a unit so designed as to render it very easy to plate all parts thereof for thorough protection against corrosion.

Another object is to provide, in conjunction with an expansible wafer having a central nipple to which it is soldered, a support, said nipple and support coacting to protect the joint between the nipple and the wafer against strains.

Another object is to provide an expansible wafer comprising opposed cupped elements of very thin sheet metal soldered together peripherally, the joint being outside of the radius of the cupped portions of said elements and adding but slightly to the overall dimensions of the wafer.

Various other objects and advantages of the invention will hereinafter appear.

An embodiment of the invention is illustrated in the accompanying drawing which will now be described, it being understood that the embodiment illustrated is susceptible of modification without departing from the scope of the appended claims.

In the drawing,

Figure 1 is an enlarged elevational view, partly in section, showing parts of a conventional form of refrigerator controller equipped with a preferred form of operating means of the wafer type;

Fig. 2 is an enlarged elevational view, partly in section, of the gas containing unit shown in Fig. 1;

Fig. 3 is a sectional view taken on lines 3—3 of Fig. 2;

Fig. 4 is an additionally enlarged sectional view of a portion of the wafer, and Fig. 5 depicts a curve characteristic of the wafer illustrated.

Referring to Fig. 1, the refrigerator control parts shown comprise a lever 1 fulcrumed on a pin 2 carried by a frame 3 fixed to an insulating member 4 which in practice commonly constitutes a part of the enclosing casing. A complete controller inclusive of such parts is disclosed in the application of C. W. Kuhn, Serial No. 112,231, filed November 23, 1936, and it is here to be assumed that as shown in said application lever 1 is adapted to be suitably connected to the control switch to be actuated which commonly is of the snap type. The lever 1 has shown associated therewith a helical loading spring 5 having at its end a corrugated disk 6 with which engages a conical member 7 carried by the lever 1, the spring 5 serving to bias the lever toward the supporting member 4.

The expansible wafer is designated by reference numeral 8, said wafer being supported in a cupped casing 9 secured to the insulating member 4 which supports the lever 1, said insulating member being cut away at 10 to give clearance for a pressure transmitting member 11 interposed between the wafer 8 and the lever 1. As will be understood, the wafer 8 upon expansion tends to force the lever 1 to move against the pressure of spring 5, whereas upon contraction of the wafer spring 5 moves the lever in a reverse direction. In this instance the wafer is required to move the element 11 bearing against the lever 1 about $\frac{1}{16}''$ for movement of the lever to effect snap action of a switch suitable to control the usual fractional horsepower motor commonly employed for operating the refrigerator compressor, this range of movement involving some overtravel for a margin of safety.

The thermally responsive unit of which the wafer 8 constitutes an element comprises in addition a gas filled bulb 12 which preferably is of the spiral form illustrated although it may assume other forms, and a tube 13 connecting said bulb with the wafer.

The wafer 8 while being in a broad sense of a well known form differs essentially from the expansible wafers heretofore used in connection with other control devices of various kinds. As hereinbefore indicated it must be of very small diameter, preferably about $1\frac{1}{4}''$, sensitive, capable of imparting movement of the order of $\frac{1}{16}''$, capable of supplying a substantial force, capable of functioning smoothly and with uniformity and able to withstand many operations daily over a period of many years. To meet these and other requirements the wafer must be formed of very thin sheet metal and preferably is formed of beryllium copper of a thickness of about .005'' and of selected grain size such that at all points will the cross section of a wall thereof have a thickness of several grains. Also to meet such requirements the sheet metal is formed to minimize strains thereon, and to this end the wafer is made up of two cupped elements A and B of such shape as to be readily formed without undue straining of the very thin sheet metal employed therefor. Preferably sharp bends for the walls of the cupped portions are avoided whereby such cupped portions when distended will take the form illustrated in the drawing. The cupped elements A and B which are assembled in an opposed relation and secured together peripherally thereof must, of course, have a gas tight joint and one of strength and durability, for the wafer being of small diameter and of very thin sheet metal imposes severe strains on the joint between the two sections and the wafer is subjected to pressure approximating 100 lbs. per square inch. Because of failure of the joint when formed of soft solder it has been found highly desirable if not imperative to join the elements A and B with silver solder, thus presenting the problem of applying sufficient heat for soldering without warping or otherwise impairing the very thin sheet metal elements. The joint illustrated has been found very satisfactory, the same comprising radially extending continuous flanges 16 and 17 on elements A and B, respectively, the flange 16 extending slightly beyond the flange 17 and having an angularly disposed continuous flange or ring 18 at its periphery. With this construction a ring of silver solder closely fitting against the inside wall of the ring or flange 18 may be melted without injury to the wafer to form a continuous solder ring 19 of the cross section shown in Fig. 4. With the flanges 16 and 17 properly spaced capillarity draws the solder between such flanges and by localizing the heat applied the exposed portion of the solder ring may be maintained spaced from the cupped portion of element B as illustrated. Such a continuous ring of hard solder forms with the flanges a very strong and durable joint with but slight increase in the diameter of the wafer as compared with the diameter of the cupped portions, and without impairment of either cupped portion by flow thereonto of the solder.

Whereas element A of the wafer is formed of a circular disk the element B is of annular form, having a central opening to receive a nipple 20 into which the tube leading to the bulb is fitted. Here also a joint of hard solder is highly desirable, if not imperative. To provide the desired joint the nipple preferably is provided exteriorly with a surrounding groove 21 and with an end flange 22 having an annular shoulder 23 over which the inner margin of the sheet metal element B may be sprung to drive it edgewise into the groove 21 in the nipple. With this construction and with the nipple formed as shown with relatively thin walls it is possible to make a joint of hard solder without injury to the wafer. This may be accomplished by surrounding the nipple with a closely fitting ring of silver solder and then heating the bushing to melt the solder to produce a continuous solder ring 24 adhering to the nipple and the element B. With the construction illustrated the element B except at its inner margin may be kept sufficiently cool to prevent the solder from flowing too far onto element B.

The joint thus provided between the wafer and its nipple would not be durable if left unprotected, and for its protection the casing 9 is provided with an annular bead 25 which coacts with the annular shoulder 23 on the nipple to clamp the interposed wall of the wafer along a line encircling the joint. Thus flexing of the element B of the wafer is limited to points spaced from the soldered joint and the clamping parts are curved in cross section to enable element B to assume natural curvatures in flexing. This clamping action of the casing and nipple preferably is preserved by providing the casing with a sleeve 26 closely fitting the nipple and by striking in the metal of the sleeve at a number of points circumferentially thereof to distort the wall of the nipple for interlock therewith.

The tube 13 preferably is joined to the nipple by a ring 27 of silver solder, and preferably the wafer, tube 13 and bulb 12 are assembled and plated as a unit prior to attachment of the wafer casing 9, the nipple being of such diameter that the close fitting casing sleeve may be slipped over the bulb. This enables plating of all external parts of these elements for thorough protection against corrosion. The casing 9 having been plated at the same time or previously may then be applied to complete the unit for mounting, the casing forming a mounting medium, and to this end being provided with a square flange 28 having corner openings 29 to receive screws or bolts 30. While casing 9 is open and does not limit expansion of the wafer it has ben found that a wafer constructed as described will be self protective against injurious expansion even at the highest temperature to which it is subjected in its manufacture and handling prior to installation.

The element 11 interposed between the wafer and the lever 1 comprises a pin having a conical tip 31 projecting into a tapered recess provided in a bearing block 32 on lever 1 for a single point contact therewith. At its opposite end the element 11 has fixed thereto a disk 33 bearing against the wafer centrally of the latter, but being without attachment to the wafer. The disk 33 and the flange 22 of the nipple preferably are of the same diameter whereby the two walls of the wafer will have like annular portions to flex in response to changes in pressure. Also as will later appear the selection of diameter for such parts is important.

The assembly is such that the wafer even when subjected to the maximum internal pressure is compressed by the loading spring to such a degree that both walls of the wafer are sprung inwardly beyond the snap point, if any, it being understood that a snap point is not essential and may not appear. Thus the wafer will function throughout its working range without snap action of either wall and by working the wafer throughout its range with its walls sprung inwardly it is possible to obtain a maximum of motion of the pressure transmitting member for the pressure variations relied upon, assuming the diameter of the disk 33 bearing on the wafer to be properly selected. The diameter of the disk must bear the proper relation to the diameter of the wafer, determinable by test, to afford the wafer maximum effective area and the desired sensitivity, the term "effective area" as herein used meaning the ratio of change in thrust pressure in the wafer.

With a wafer such as that described employed in the manner set forth the same may be relied upon to act on lever 1 with all necessary force and smoothly and with uniformity. Referring to to the characteristic curve depicted in Fig. 5, the same shows the ratio of changes in thrust of the wafer on the pressure transmitting member to changes in pressure, or in other words, effective area of the wafer for different positions of the walls of the wafer. The portion a—b of the curve is obtained with the walls of the wafer sprung outwardly, while the portion c—d of the curve is obtained with the walls of the wafer sprung inwardly. Thus it will be observed that maximum effective area and sensitivity are obtained in the portion c—d of the curve and that a uniform effective area for a wide range in motion of the wafer is obtainable.

What we claim as new and desire to secure by Letters Patent is:

1. In an operating mechanism for refrigerator controllers and the like, in combination, a movable member, a loading spring biasing said member in one direction, a pressure responsive expansible wafer formed of opposed cupped elements of thin sheet metal connected peripherally, a member interposed between said movable member and said wafer, and means to support all such parts in a cooperative relation, said wafer having fixed to one wall centrally thereof a nipple and said supporting means including a cupped casing for said wafer in which said wafer is supported by said nipple with clearance between said wafer and said casing at the periphery of said wafer and throughout an annular area of said wafer, said nipple having within said wafer an annular shoulder surrounding the joint between said wafer and said nipple and said casing having an annular bead clamping against said annular shoulder of said nipple the interposed wall of said wafer.

2. In an operating mechanism for refrigerator controllers and the like, in combination, a movable member, a loading spring biasing said member in one direction, a pressure responsive expansible wafer formed of opposed cupped elements of thin sheet metal connected peripherally, a member interposed between said movable member and said wafer, and means to support all such parts in a cooperative relation, said wafer having fixed to one wall centrally thereof a nipple and said supporting means including a cupped casing for said wafer in which said wafer is supoprted by said nipple with clearance between said wafer and said casing at the periphery of said wafer and throughout an annular area of said wafer, said nipple having within said wafer an annular shoulder surrounding the joint between said wafer and said nipple and said casing having an annular bead clamping against said annular shoulder of said nipple the interposed wall of said wafer, said casing having a portion closely surrounding and crimped on said nipple.

3. In an operating mechanism for refrigerator controllers and the like, in combination, a biased lever, a gas containing unit including an expansible wafer formed of opposed cupped elements of thin sheet metal united peripherally, a member interposed between said wafer and said lever comprising a pin having a point connection with said lever and having an attached disk bearing against a wall of said wafer centrally thereof but without attachment thereto, and means to support all such parts in a cooperative relation, said wafer having fixed to one wall centrally thereof a nipple and said supporting means including a cupped casing for said wafer in which said wafer is supported by said nipple with clearance between said wafer and said casing at the periphery of said wafer and throughout an annular area of said wafer, said nipple and said casing having cooperating annular parts to clamp therebetween the nipple carrying wall of said casing, the area of such wall bounded by such clamping parts being substantially the same as the area of said wafer engaged by said disk.

4. In an operating mechanism for refrigerator controllers and the like, in combination, a biased lever, a gas containing unit including an expansible wafer formed of opposed cupped elements of thin sheet metal united peripherally, a pressure transmitting member interposed between said lever and said wafer and having its area of engagement with said wafer proportioned to afford said wafer a maximum effective area, and means to support all of such parts in a cooperative relation with the walls of said wafer sprung to take an inward curvature and to retain an inward curvature under operating conditions, said wafer having fixed to one wall centrally thereof a nipple, and said supporting means including a casing for said wafer in which said wafer is supported by said nipple, said nipple having within said wafer an annular shoulder, and said casing having an annular shoulder clamping against said annular shoulder of said nipple the interposed wall of said wafer, the area bounded by said clamping shoulders being substantially the same as the area of engagement between said wafer and said pressure transmitting member.

5. In an operating mechanism for refrigerator controllers and the like, in combination, a pressure responsive element having the form of a hollow and thin wafer and having its main walls formed of thin sheet metal peripherally united in a spaced relation, one main wall of said wafer having centrally fixed thereto a nipple and a supporting casing for said wafer element to which the latter is attached by said nipple, said casing exposing one main wall of said wafer element, and said wafer element having at its periphery and throughout an annular area clearance from said casing.

6. In an operating mechanism for refrigerator controllers and the like, the combination with a gas containing unit comprising an expansible element having the form of a single wafer and having its walls formed of thin sheet metal peripherally united in a spaced relation, one wall of said wafer having fixed thereto a nipple and said unit further comprising a bulb connected to said nipple, of a supporting casing for said wafer element to which the latter is secured through the medium of said nipple, said casing exposing one wall of said wafer element and said wafer element having at its periphery and throughout an annular area clearance from said casing, said nipple and said casing having parts to clamp therebetween the nipple carrying wall of said wafer element at a distance from the joint between said nipple and said wafer element, the clamp bounded area of said wafer element being proportioned to afford said wafer element a maximum effective area.

7. In an operating mechanism for refrigerator controllers and the like, the combination with a gas containing unit comprising an expansible element having the form of a single wafer with a central nipple and also comprising a bulb connected to said nipple, said wafer element comprising opposed cupped parts of thin sheet metal peripherally joined with hard solder and one part being joined to said nipple with hard solder, of a support for said wafer element surrounding and gripping said nipple, said support and nipple having parts clamping therebetween the nipple carrying wall of said wafer element at a distance from said solder joint of said nipple, said support exposing the wall of said wafer element opposite said nipple and said wafer element being free from restraint at its periphery and throughout an annular area of its nipple carrying wall but being self restraining against destructive distortion at room temperature and at the same time being sensitive to relatively small changes in temperature for contraction and expansion through a relatively large range.

8. In an operating mechanism for refrigerator controllers and the like, the combination with a gas containing unit comprising a bulb, a tube leading therefrom and an expansible wafer having a nipple to which said tube is connected, of a supporting casing for said wafer to which the latter is fixed through the medium of said nipple, said casing being attachable to said wafer after assembly and plating of said wafer, bulb and connecting tube, and said casing and nipple having annular shoulders for clamping therebetween the nipple carrying wall of said wafer at a distance from the joint between said wall and its nipple.

CLARENCE W. KUHN.
ALLAN P. CHARBONNEAU.